(12) United States Patent
Groves, Jr. et al.

(10) Patent No.: US 8,457,148 B2
(45) Date of Patent: Jun. 4, 2013

(54) METHOD FOR MAINTAINING VITAL GUIDEWAY OPERATION IN HIGH-DEMAND AREAS

(75) Inventors: Robert B. Groves, Jr., Manassas, VA (US); Richard A. Allshouse, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 489 days.

(21) Appl. No.: 12/723,566

(22) Filed: Mar. 12, 2010

(65) Prior Publication Data

US 2010/0232451 A1    Sep. 16, 2010

Related U.S. Application Data

(60) Provisional application No. 61/159,667, filed on Mar. 12, 2009.

(51) Int. Cl.
*H04L 12/413* (2006.01)
(52) U.S. Cl.
USPC ..................... 370/444; 370/395.42
(58) Field of Classification Search
CPC .................................................. H04W 72/087
USPC ................. 370/395.42, 444, 455; 701/19–20
See application file for complete search history.

(56) References Cited

U.S. PATENT DOCUMENTS

| | | | |
|---|---|---|---|
| 3,806,804 A | 4/1974 | Mills et al. | |
| 4,788,543 A | 11/1988 | Rubin | |
| 5,570,284 A * | 10/1996 | Roselli et al. | 701/2 |
| 5,950,966 A * | 9/1999 | Hungate et al. | 246/62 |
| 6,023,230 A | 2/2000 | Dorenbosch et al. | |
| 6,115,599 A | 9/2000 | Stilp | |
| 6,163,541 A | 12/2000 | Casey et al. | |
| 6,928,342 B2 * | 8/2005 | Horst | 701/19 |
| 7,034,678 B2 | 4/2006 | Burkley et al. | |
| 7,047,002 B2 * | 5/2006 | Lazoff | 455/422.1 |
| 7,054,612 B2 | 5/2006 | Patel | |
| 7,103,646 B1 * | 9/2006 | Suzuki | 709/220 |
| 7,107,023 B1 | 9/2006 | Derome, Jr. et al. | |
| 7,167,713 B2 | 1/2007 | Anderson | |
| 7,194,249 B2 | 3/2007 | Phillips et al. | |
| 7,212,506 B2 | 5/2007 | Varney et | |
| 7,221,941 B2 | 5/2007 | Seon | |
| 7,245,216 B2 | 7/2007 | Burkley et al. | |

(Continued)

FOREIGN PATENT DOCUMENTS

| | | |
|---|---|---|
| JP | 62230233 A | 10/1987 |
| JP | 08126052 A | 5/1996 |
| SU | 1352443 A1 | 11/1987 |
| WO | 9110300 A1 | 7/1991 |

OTHER PUBLICATIONS

Abu-Hakima et al., "Cooperative Agents that Adapt for Seamless Messaging in Heterogeneous Communication Networks", "http://iit-iti.nrc-cnrc.gc.ca/iit-publications-iti/docs/NRC-39214.pdf".

(Continued)

*Primary Examiner* — Ricky Ngo
*Assistant Examiner* — Ben H Liu
(74) *Attorney, Agent, or Firm* — Kaplan Breyer Schwarz & Ottesen, LLP

(57) ABSTRACT

A method for reducing delays in the receipt of high priority information in a transportation system is disclosed.

18 Claims, 9 Drawing Sheets

U.S. PATENT DOCUMENTS

| | | | |
|---|---|---|---|
| 7,433,766 B2* | 10/2008 | Ruckser | 701/19 |
| 7,731,129 B2* | 6/2010 | Stull et al. | 246/3 |
| 7,756,613 B2* | 7/2010 | Katsuta et al. | 701/19 |
| 7,804,805 B2* | 9/2010 | Park et al. | 370/338 |
| 7,809,002 B2* | 10/2010 | Das et al. | 370/395.42 |
| 8,090,486 B2* | 1/2012 | Meyer et al. | 701/20 |
| 2003/0058824 A1* | 3/2003 | Petterson et al. | 370/338 |
| 2004/0095954 A1* | 5/2004 | Varney et al. | 370/444 |
| 2005/0101324 A1 | 5/2005 | Chambers et al. | |
| 2005/0265282 A1 | 12/2005 | Gross et al. | |
| 2006/0046687 A1 | 3/2006 | Kwon | |
| 2006/0160522 A1 | 7/2006 | Jennings | |
| 2007/0058658 A1 | 3/2007 | Ruckart | |
| 2009/0184212 A1* | 7/2009 | Allshouse et al. | 246/3 |
| 2009/0323697 A1* | 12/2009 | Celentano et al. | 370/395.42 |
| 2010/0074160 A1* | 3/2010 | Mason et al. | 370/315 |
| 2010/0232451 A1* | 9/2010 | Groves et al. | 370/431 |
| 2011/0035083 A1* | 2/2011 | Groves et al. | 701/19 |

OTHER PUBLICATIONS

Mesaros, Valentin, "Multichannel Data Protocol", "http://64.233.169.104/search?q=cache:OjYgLzWiltsJ:www.mozart-oz.org/mogul/doc/cetic_ucl/p2ps/mdp/mdp_usr_abstr.ps.gz+multichannel+communication+priori".

Eichler, Stephan, "Performance Evaluation of the IEEE 802.11p WAVE Communication Standard", "http://www.lkn.ei.tum.de/forschung/publikationen/dateien/Eichler2007PerformanceEvaluationofthe.pdf".

\* cited by examiner

METHOD FOR MAINTAINING VITAL GUIDEWAY OPERATION IN HIGH-DEMAND AREAS

CROSS-REFERENCE TO RELATED APPLICATIONS

This application claims the benefit of U.S. provisional application Ser. No. 61/159,667, filed Mar. 12, 2009, entitled Method for Maintaining Vital Guideway Operation in High-Demand Areas, which is also incorporated by reference.

FIELD OF THE INVENTION

The present invention relates to railways in general, and, more particularly, to communications within a railway system.

BACKGROUND OF THE INVENTION

The operation of a railway requires the transmission of a large quantity of information, some of which is safety critical (so called "vital") and some of which is not. Yet, most railway systems have only limited channel and data-rate capabilities. An example of the information flow through a conventional railway system is discussed below in more detail in conjunction with FIG. 1, which depicts a portion of prior-art railway system 100.

FIG. 1 depicts central control center 102, main line 104, branch lines 106, 108, and 110, track switches 112, 114, and 116, and trains 118, 120, and 122. The central control center, the trains, and the track switches all have telecommunications capability (e.g., a radio, etc.). Communication occurs over a single, multiple access communications channel.

Train 118 is assumed to be inactive on branch line 108. When train 118 is "awakened" (i.e., turned on from a cold start), it will receive a large quantity of initializing information (e.g., a guide-way data base, etc.) so that it can determine its location and integrity, among any other functions. This information is typically transmitted from central control 102, as well as railway features, such as switches 112, 114, and 116.

Before train 118 is permitted to move along a guide-way, it must receive authorization to do so from central control 102. Before the center will issue authorization, it must receive information about the location (i.e., block occupancy) of requesting train 118. It must also have information about the block occupancy of nearby railway track, such as main line 104 and branch lines 106 and 110. Trains 120 and 122 will report their position to central control 102. Furthermore, central control will require information concerning the state of nearby track switches, such as switches 112, 114, and 116. Control center 102 will therefore query those switches as to their state (or the switches might regularly broadcast their state).

Much of the information that is being transmitted to and from trains, central control, and railway features during normal operations is not vital (safety critical). Unfortunately, depending on the access protocol used, the transmission of such non-vital information might preclude the transmission and/or receipt of vital information. This introduces inefficiencies and delays into the system.

The simplest approach for addressing this problem is to installed advanced communications systems, which will provide increased bandwidth and telecommunications capabilities. But that is an expensive approach, and one that infrastructure owners have been reluctant to pursue.

An approach is therefore needed to provide vital communications information on high-demand networks.

DESCRIPTION OF THE INVENTION

The present invention provides a communications architecture that enables vital data to be received in a timely manner.

In accordance with the illustrative embodiment of the present invention, two or more communications paths are created. If the infrastructure exists, then the paths can be separate; for example, one using 802.11 and another using RF. If only a single physical channel is available, then two or more logical paths are provided.

In either case, data messages are assigned one of at least two different priorities (e.g., high priority and low priority, etc.). Unlike most systems, priority is not based on message type, but rather is situational or contextual.

Consider, for example, an authority message. If the central control wishes to send a message that would grant authority (e.g., for a train to proceed, etc.), that would most likely not be safety critical. But when central control wishes to send a message that revokes authority (e.g., for a train to proceed, etc.), that is far more likely to be safety critical. In other words, a crossing gate might be open or a track switch is in a state that might direct the train toward an occupied block of track.

A second example is a message concerning the state of a track feature, such as a crossing gate or a switch. When the state of the gate or switch changes, reporting that change can be considered to be high priority. If the gate or switch is reporting on a regular basis, and there has been no change in state, then the message can be considered to have a relatively lower priority.

In some embodiments, the sending application (e.g., the switch, gate, etc.) determines the priority of the message.

In the case of a single physical channel, multiple logical channels are created by prejudicing access to physical channel. In other words, a higher priority message will have greater access to the physical channel than the lower priority message. In some embodiments, this is accomplished by providing more transmission time slots for relatively higher-priority messages than for relatively lower-priority messages. In some other embodiments, relatively higher-priority messages query the channel on a more frequent basis than relatively lower-priority messages for access (e.g., every 2 milliseconds versus every 20 milliseconds, etc.).

It is to be understood that the disclosure teaches just one example of the illustrative embodiment and that many variations of the invention can easily be devised by those skilled in the art after reading this disclosure and that the scope of the present invention is to be determined by the following claims.

DETAILED DESCRIPTION

Figure 1:
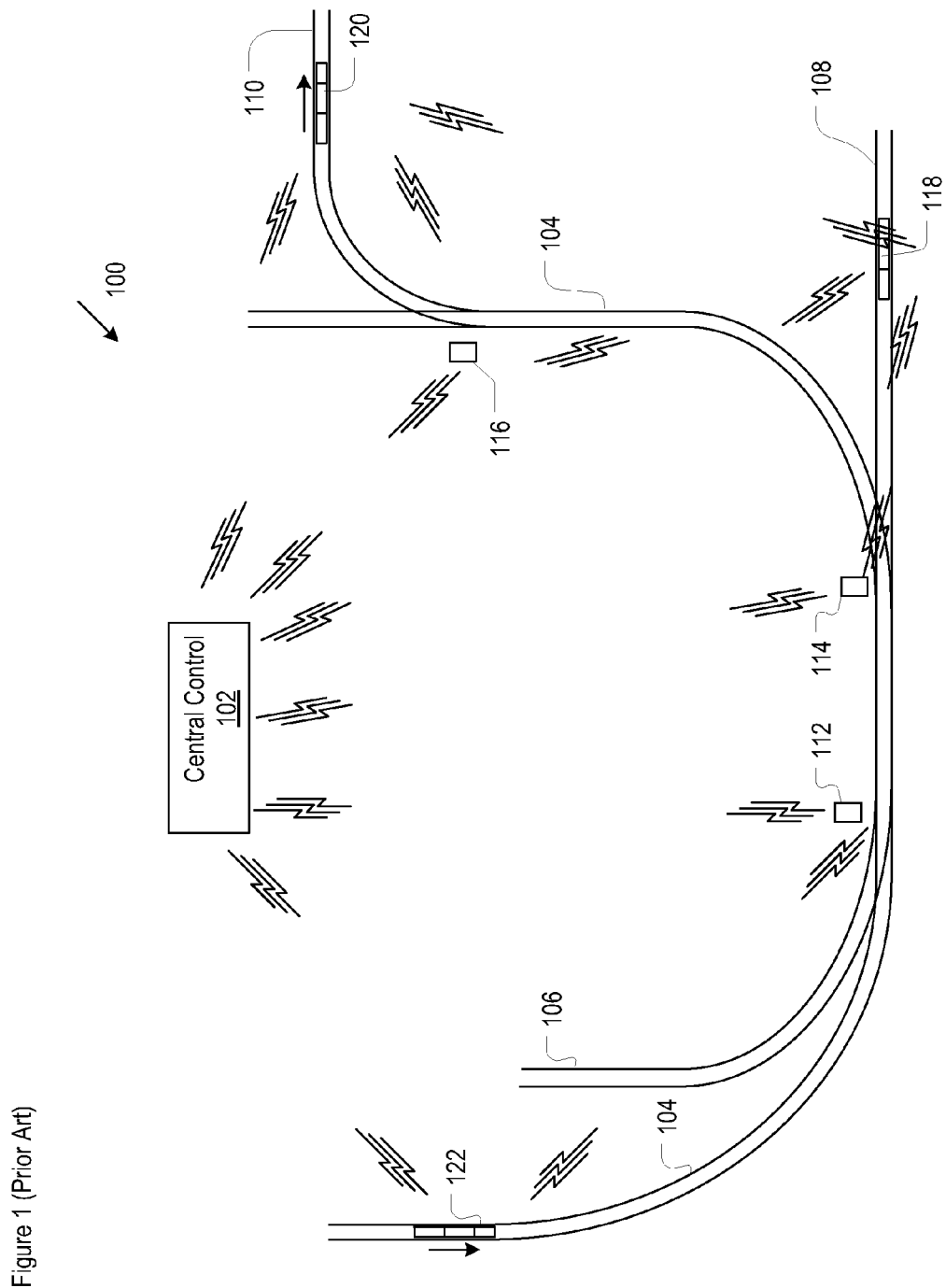
FIG. 1 depicts a schematic diagram of the salient components of a transportation system as is known in the prior art.
Figure 2A:
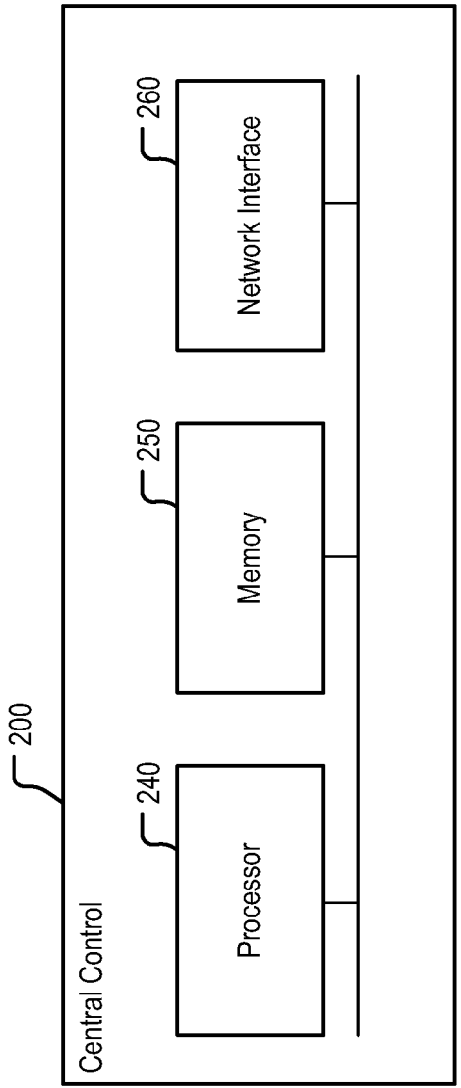
FIG. 2A depicts a schematic diagram of a computer system which hosts central control 200.

FIG. 2A depicts a schematic diagram of a computer system which hosts central control 200. The computer system comprises processor 240, memory 250, and network interface 260.

Processor 240 is a central processing unit (CPU) configured to execute computer code. It will be clear to those skilled in the art how to make and use processor 240.

Memory 250 is a storage device that is addressable by processor 240. In accordance with the illustrative embodiment of the present invention, memory 250 is random access memory (RAM). However, it will be clear to those skilled in the art, after reading this disclosure, how to make and use alternative embodiment of the present invention in which memory 250 is any type of volatile or non-volatile storage device.

Network interface 260 is hardware which enables central control 200 to transmit and receive communications over at least one telecommunications network. It will be clear to those skilled in the art how to make and use network interface 260.

Figure 2B:
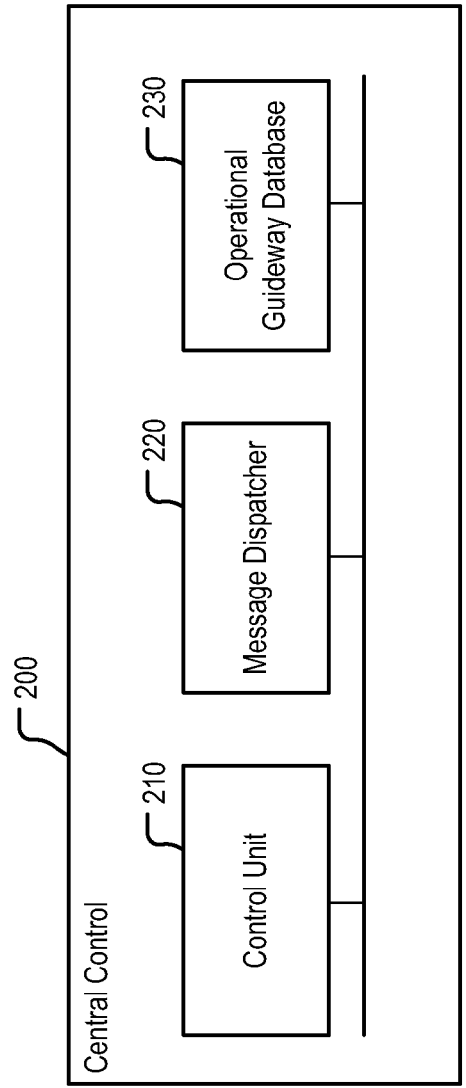
FIG. 2B depicts a schematic diagram of the salient logical components of central control 200.

FIG. 2B depicts a schematic diagram of the salient logical components of central control 200. Central control 200 comprises control unit 210, message dispatcher 220, and operation guideway database 230. In accordance with the illustrative embodiments of the present invention, the logical components are implemented as software stored in memory 250 and executed by processor 240. However, it will be clear to those skilled in the art, after reading this disclosure, how to make and use alternative embodiments of the present invention in which at least parts of control unit 210, message dispatcher 220, or operation guideway database 230 are implemented in hardware.

Central control 200 is a railway control system. Central control 200 is capable of accelerating and stopping trains, changing the state of trackside equipment such as switches and railroad gates, and maintaining sufficient quality of service for the passengers who use the railway system. In performing its functions, central control 200 has to meet a variety of constraints. The most important of these constraints are the ones related to safety, such as: maximum block occupancy, speed, distance between trains, and others. Furthermore, central control 200 has to meet constraints that are designed to ensure that the railway system delivers a sufficient quality-of-service (i.e., that the trains are on time, etc.). Such constrains can specify the maximum amount of time which a train is allowed to spend at a stop; how fast should the train accelerate, and others.

Control unit 210 is responsible for controlling rail system 300 and ensuring that various constraints for its operation are met. Control unit 210 fulfils its duties by sending and receiving messages to different components of the railway system, such as trains, trackside equipment, etc. Control unit 210 sends at least two types of messages: messages which require railway system components to take action and messages which provide information updates. Examples of the messages which require railway system components to take action are "stop train", "remain stationary", "lower gateway", and "change state of a track switch." Examples of messages which provide information updates are "switch 320 is now in the 'north' state" and "gate 330 is lowered."

An essential attribute of the messages sent by control unit 210 is priority. The priority of the messages is determined by message dispatcher 220.

Message dispatcher 220 is responsible for determining message priority. In operation, message dispatcher receives messages from control unit 210 along with an instruction to dispatch those messages to specified destinations. When the messages have high priority, message dispatcher 220 transmits them via a first telecommunications channel. When the messages have a low priority, message dispatcher 220 transmits them via a second telecommunications channel.

Operation guideway database 230 is a database which contains information about the states of different components of rail system 300 (e.g., trains, gates, track switches, etc.).

Although central control 200 is depicted as a monolithic element, it will be clear to those skilled in the art, after reading this disclosure, that central control 200 can include numerous interconnected computers and components designed to control the railway system. Those skilled in the art will readily recognize, after reading this disclosure, that alternative embodiments of the present invention can be devised in which at least one of control unit 210, message dispatcher 220, and operational guideway database 230 is hosted on one or more computers that are separate from the computers executing the remaining logical components of central control 220.

Figure 3:
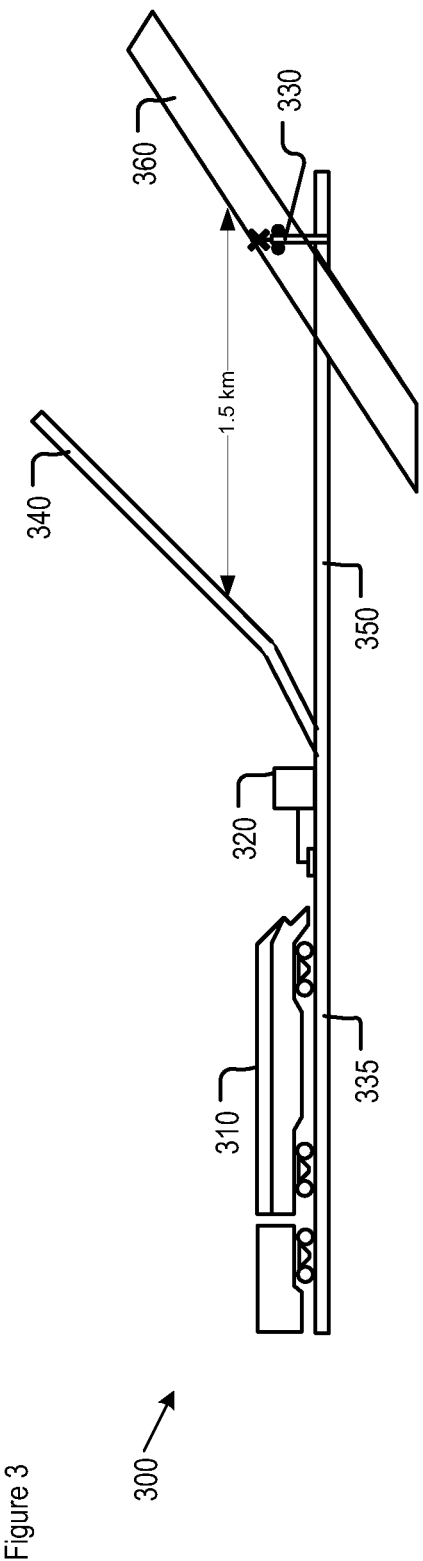
FIG. 3 depicts rail system 300.

FIG. 3 depicts rail system 300. Rail system 300 comprises train 310, switch 320, gate 330, and track sections 335, 340, and 350.

Figure 4:
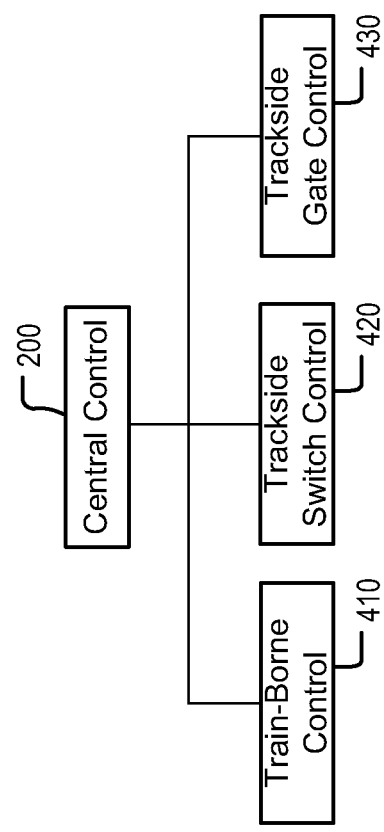
FIG. 4 depicts a schematic diagram of the communicative coupling between the components of rail system 300.

Train 310 comprises train-borne control 410 (see, e.g., FIG. 4). Train-borne control 410 is hardware and software for controlling the train. Train-borne control 410 is capable of receiving instructions from central control 200 and executing them. Examples of such instructions are "stop" and "accelerate." Additionally, train-borne control 410 is capable of receiving updates on the state of rail system 300 (e.g. distance from highway 360, etc.). And furthermore, train-borne control 410 is itself capable of transmitting messages to train control 310.

Train 310 can be in one of two states: "moving" and "stopped." Although only two states are discussed, it is readily apparent that train states are more complex than the example provided above. They may account for speed, acceleration, location, weight, distance from trackside features, etc. It will be clear to those skilled in the art how to apply the teachings of this specification to train states that are more complex.

Switch 320 is a track switch. Switch 320 can be in one of two states: "north" and "east." When switch 320 is in the "north" state, trains traveling along track section 335 are routed onto track section 340. When switch 320 is in the "east" state, trains traveling along track section 335 are routed onto track section 350.

Switch 320 comprises switch control 420 (see, e.g., FIG. 4). Switch control 420 is hardware and software for controlling the state of switch 320. Switch control 420 is capable of receiving instructions from central control 200 and executing them. Examples of such instructions include "transition into the 'north' state" and "transition into the 'east' state." Additionally, switch control 420 is capable of reporting the state of switch 320 to central control 200.

Gate 330 is a railway crossing gate. Gate 330 can be in one of two states: "lowered" and "raised." When gate 330 is the "raised" state, traffic on highway 360 can cross track section 350 freely. When gate 330 is in the "lowered" state, the traffic is held.

Gate 330, comprises gate control 430 (see, e.g., FIG. 4). Gate control 430 is hardware and software for controlling the state of gate 330. Gate control 430 is capable of receiving and executing instructions from central control and executing them. Examples of such instructions are "lower gate" and "raise gate." Additionally, gate control 430 is capable of reporting the state of gate 330 to central control 200.

Highway 360 is a public road on which automobiles travel.

The state of rail system 300 is derived from the states of one or more of its components. In accordance, with the illustrative embodiment of the present invention, rail system 300 can be in one of eight states:

TABLE 1

Exemplary States of Rail System 300

| Rail System 310 State ID | Train 310 State | Switch 320 State | Gate 330 State |
|---|---|---|---|
| State #1 | "moving" | "east" | "lowered" |
| State #2 | "moving" | "east" | "raised" |
| State #3 | "moving" | "north" | "lowered" |
| State #4 | "moving" | "north" | "raised" |
| State #5 | "stopped" | "east" | "lowered" |
| State #6 | "stopped" | "east" | "raised" |
| State #7 | "stopped" | "north" | "lowered" |
| State #8 | "stopped" | "north" | "raised" |

State #2 is characterized by train 310 moving towards the intersection with highway 360 while gate 330 is raised. In state #2, an accident can happen because the raised gate permits vehicles to be on track section 350 at the time when train 310 is passing. For this reason, state #2 is classified as hazardous.

State #3 is characterized by train 310 being routed in a north-bound direction while gate 330 is lowered. When rail system 300 is in state #3, train 310 is routed away from the intersection with highway 360. Therefore, the traffic on highway 360 is held by gate 330 for no reason. State 3 is classified as undesirable.

Figure 7:
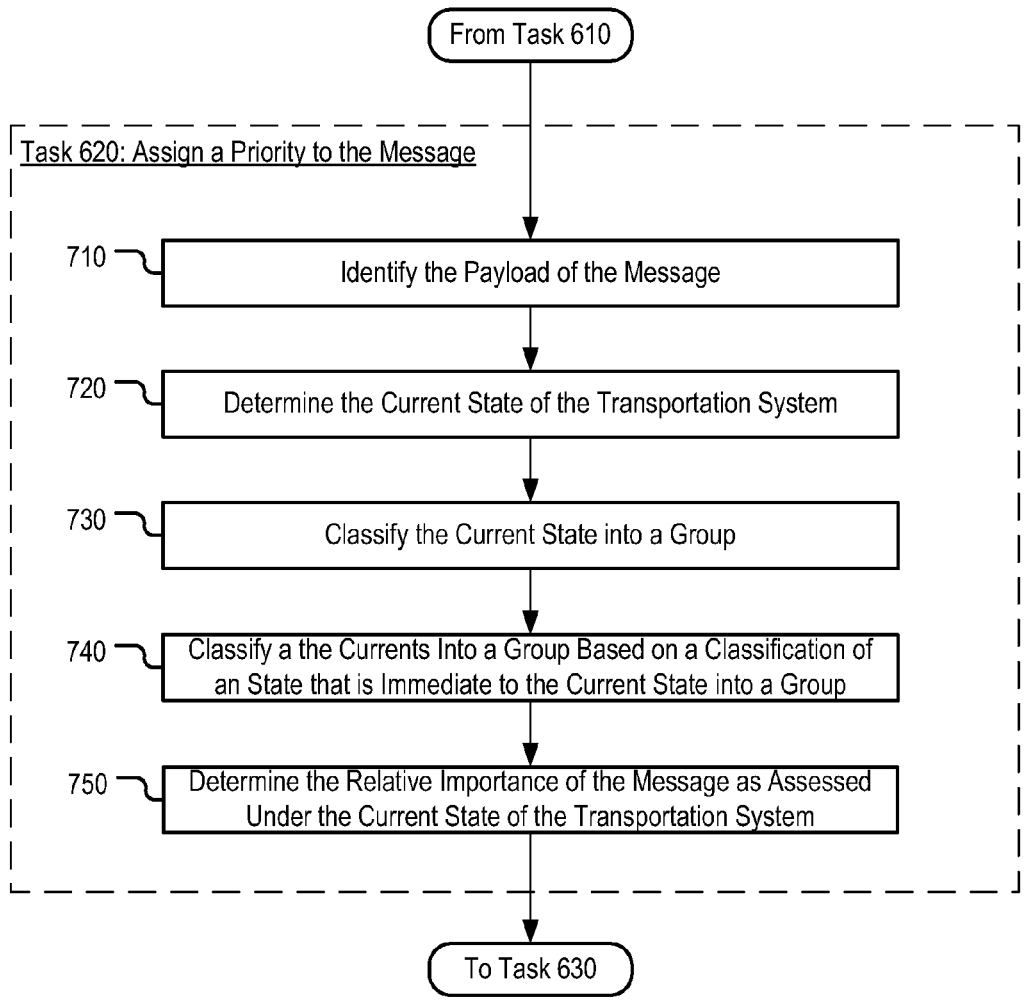
FIG. 7 depicts a flowchart of the execution of the salient subtasks associated with assigning a priority to the message received at task 610.

The classification of states into groups, such as "hazardous" or "undesirable," is further described in the discussion with respect to FIG. 7.

FIG. 4 depicts a schematic diagram of the communicative coupling between the components of rail system 300. In accordance with the illustrative embodiment of the present invention, central control 200, train-borne control 410, switch control 420, and gate control 430 can transmit messages to each other via two communication channels. The communication channels which connect central control 200 to the other components of rail system 300 are further described in the discussion with respect to FIG. 6.

Figure 5:
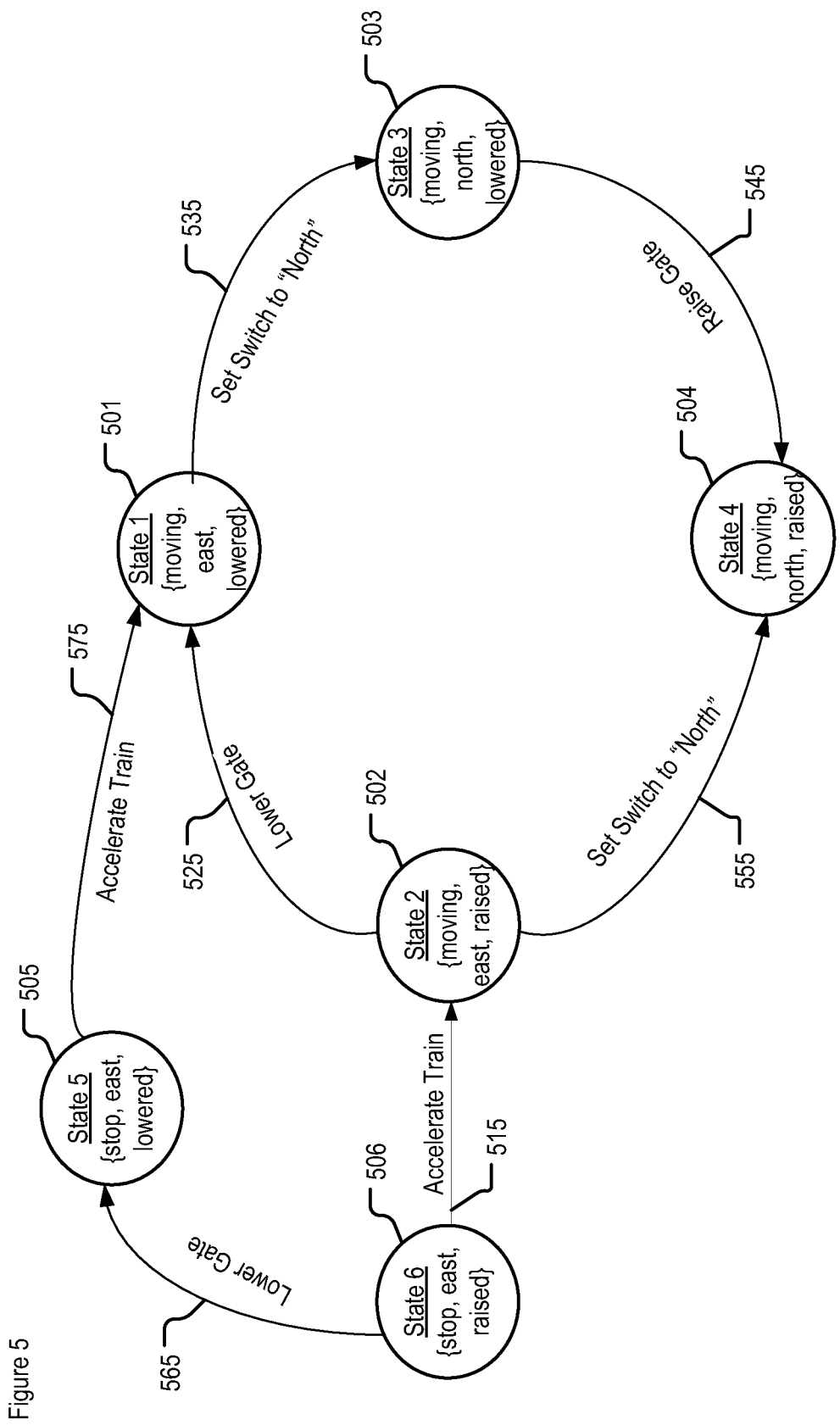
FIG. 5 depicts a state transition chart for some of the states listed in Table 1.

FIG. 5 depicts a state transition chart for some of the states listed in Table 1. The states in the flowchart are shown as 3-tupples of the form <state of train 310 |state of switch 320|state of gate 330>. In particular, the states depicted are states 1-6 (a.k.a, states 501, 502, 503, 504, 505, and 506, respectively). Additionally, FIG. 5 illustrates the manner in which state transitions occur. As shown, the state transitions are caused by the sending of messages 515, 525, 535, 545, 555, 565, and 575.

Consider, for example, that rail system 303 is in state 506. State 506 is characterized by train 310 being stationary, switch 320 set in the "east" state, and gate 330 raised. From State 506, rail system 300 can transition to either of states 505 and 502.

As noted, state 502 is hazardous. State 502 is characterized by train 310 moving, switch 320 set in the "east" state and gate 330 raised. The state is hazardous because train 310 is travelling towards the intersection with highway 360 without gate 330 being lowered. When rail system is in state 502, there is a heightened risk that an accident will happen.

Further consider that while rail system 300 is in state 506, message dispatcher 220 is requested to send two messages at the same time. The two messages are "accelerate train" and "lower gate." If the "lower gate" message is lost or delayed while the "accelerate train" message is delivered successfully, rail system 300 will enter state 502. To prevent this from happening, message dispatcher 220 will assign a high priority to the "lower gate" message. The assignment of high priority ensures that the "lower gate" message is sent over channel that is comparatively dependable and/or reliable.

As another example, consider that rail system 300 is in state 502. Further consider that message dispatcher 220 is instructed to dispatch message 525. Because message 535 will cause rail system 300 to exit a hazardous state—state 502—message dispatcher will, in this case, also assign a high priority to message 525.

The assignment of priorities to messages by message dispatcher 220 is further described in the discussion with respect to FIG. 7. Nevertheless, it should be noted that the priorities which messages are assigned depend on a state of rail system 300 (e.g., the current state, an immediate state, etc.). The priorities are consequently said to be situational or contextual.

In accordance with the illustrative embodiment of the present invention, the state transitions are certain to occur when messages 515-575 are transmitted and executed. However, it will be clear to those skilled in the art, after reading this disclosure, how to make and use alternative embodiments of the present invention in which the state transitions have probabilities (or other measures of likelihood) associated with them; e.g., "80% percent probability that rail system will transition from state 506 into state 502 when message 515 is transmitted and executed, etc. Furthermore, it will be clear to those skilled in the art, after reading this disclosure, that alternative embodiments of the present invention can be devised in which state transitions are triggered by the passage of time, or another stimulus.

In any event, it must be recognized that the state model depicted in FIG. 5 is provided for illustrative purposes only. It will be clear to those skilled in the art that operational state models of rail systems have to account for a variety of component states (e.g. train speed, location, block occupancy, etc.). It will be clear to those skilled in the art how to devise such models and use them, after reading this disclosure, in conjunction with the methods of the present invention.

Figure 6:
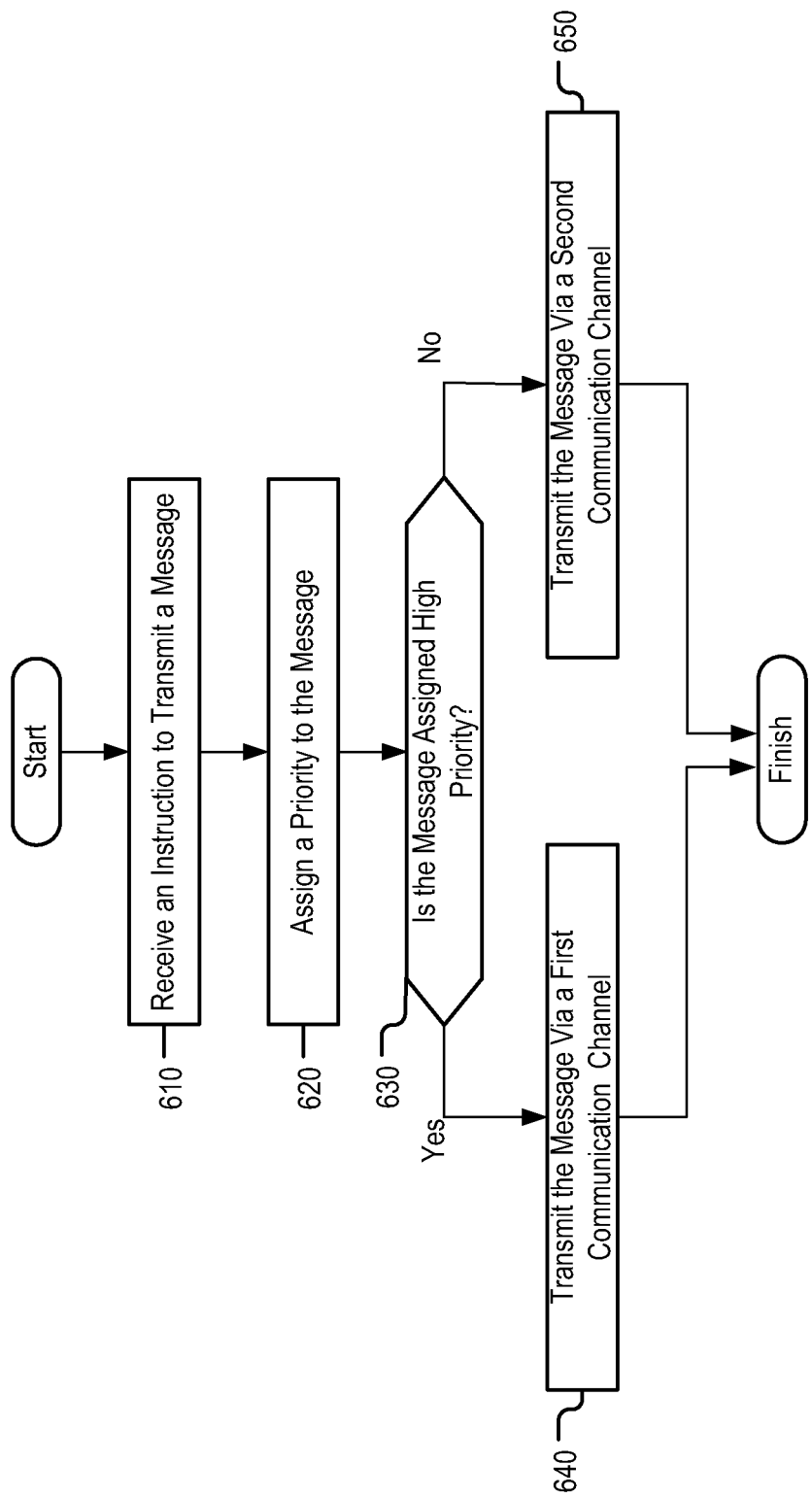
FIG. 6 depicts a flowchart of the execution of the salient tasks associated with the operation of the illustrative embodiment of the present invention.

FIG. 6 depicts a flowchart of the execution of the salient tasks associated with the operation of the illustrative embodiment of the present invention. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

Although, in accordance with the illustrative embodiment of the present invention, tasks 610-640 are executed by central control 200, it will be clear to those skilled in the art, after reading this disclosure, that alternative embodiments of the present invention can be devised in which tasks 610-640 are executed by another component of rail system 300 (e.g., train-borne control 410, switch control 420, gate control 430, etc.). Furthermore, it will be clear to those skilled in the art, after reading this disclosure, how to make and use alternative embodiments of the present invention in which the tasks are executed by any component of central control 200 (e.g., control unit 210, etc.).

At task 610, message dispatcher 220 receives an instruction to transmit a message to a component of a rail system 300.

At task 620, message dispatcher 220 assigns a priority to the message. Task 620 is further described in the discussion with respect to FIG. 7.

At task 630, determines if the message is assigned a high priority. If yes, message dispatcher 220 proceeds to execute task 640. Otherwise, message dispatcher executes task 650.

At task 640, message dispatcher 220, in a well known fashion, transmits the message over a first telecommunications channel.

At task 650, message dispatcher 220, in a well known fashion, transmits the message over a second telecommunications channel.

In accordance with the illustrative embodiment of the present invention, the first channel differs in at least one of: capacity, dependability, reliability, availability, accessibility, security, or any other quality-of-service attribute from the second channel. However, it will be clear to those skilled in the art, after reading this disclosure, how to make and use alternative embodiments of the present invention in which the first and second channels do not differ.

Moreover, in accordance with the illustrative embodiment of the present invention, the first channel and the second channel are network paths in different physical networks (e.g., a 802.11g and RF networks, etc.). However, it will be clear to those skilled in the art, after reading this disclosure, how to make and use alternative embodiments of the present invention in which the first and second channels are different logical channels in the same physical network. The different logical channels can be created by prejudicing access to one of the channels in favor of the other (i.e., according more access slots to one of the channels), by using virtual private network (VPN) technology, or in any other way that is known in the art.

FIG. 7 depicts a flowchart of the execution of the salient subtasks associated with assigning a priority to the message received at task 610. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks. Specifically, it will be clear to those skilled in the art, after reading this disclosure, how to devise alternative embodiments of the present invention in which task 740 is omitted.

At task 710, message dispatcher 220 identifies the content of the message. In accordance with the illustrative embodiment of the present invention, at least two types of messages are transmitted by central control 200: messages that request a component of transportation system 300 to take action; i.e., messages that order components of transportation system 300 to change their state (e.g., lower gate, etc.). And messages that provide information updates (e.g., train 310 is 3 km away and travelling at 85 km/h). Depending on the state of rail system 300, both types of messages can have high or low priority.

At task 720, message dispatcher 220, determines the current state of rail system 300. In accordance with the illustrative embodiment of the present invention, the current state is determined by querying operational guideway database 230 about the state of at least one of the components of rail system 300. However, it will be clear to those skilled in the art, after reading this disclosure, that the state can be determined by querying individual components of transportation system 300.

At task 730, message dispatcher 220 classifies the current state into a group. In accordance with the illustrative embodiment of the present invention, the current state is classified into one of "desirable" and "undesirable" groups. An "undesirable" state can be a state in which an operation constraint is violated. The constraint can be related to safety or to any aspect of the operation of rail system 300. Examples of such constraints include:

(1) Do not hold traffic on highway 360 for no reason.
(2) Keep at least 5 km distance between trains.
(3) Do not travel at speeds in excess of 80 km/h.
(4) Arrive at train station on time.

In accordance with the illustrative embodiment of the present invention, the classification of the message received at task 610 into a group is performed automatically by message dispatcher 220. Specifically, message dispatcher 220 compares attribute(s) of a state of rail system 300 (e.g., speed of train 310) to an operational constraint specification (e.g., speed shall not exceed 80 km/h) that is stored in memory 220 and determines whether the constraint is violated.

Undesirable states can be hazardous. Hazardous states of rail system 300 are states in which safety constraints of the system's operation are violated. Additionally, states can be labeled as hazardous by users of central control 200 even though all of the operational parameters that comprise them (e.g., speed, distance, location, gate states, etc.) are within safe bounds. When a rail system is in a hazardous state, there is a non-negligible risk that an undesired event will occur (e.g., loss of life, equipment, injury, etc.). It will be clear to those skilled in the art how to identify states of rail system 300 that are hazardous.

It will be clear to those skilled in the art, after reading this disclosure, how to make and use alternative embodiments of the present invention in which the current state is classified into any type of group. In accordance with one such embodiment of the present invention, the current state of rail system 300 is classified into a group from a set of user-specified of groups (e.g. first group and second group, etc.). In this embodiment, records are stored in a database which relates an indication of a state of rail system 300 with an indication of a group identifier. Message dispatcher 220, in the alternative embodiment, classifies the message received at task 610 into a group by using a search key based on the current state of rail system 300 and retrieving a corresponding indication of a group (i.e., group designation for the state, etc.) from the database.

At task 740, message dispatcher classifies the current state of rail system 300 based on the classification of an immediate state. For the purposes of this disclosure, "immediate state" is a state to which rail system would transition as a result of: (i) the execution of an action specified by a message, or (ii) the failure of an action specified to be executed, or (iii) the failed delivery of the message, or (iv) the successful delivery of the message. The classification of immediate states is performed according to the methods described in the discussion with respect to task 730.

In accordance with the illustrative embodiment of the present invention, the current state is classified as "undesirable" when it is a precursor to an "undesirable" immediate state. For instance, state 502 is immediate to state 506. In order for state 506 to be a precursor to state 502, there must be sufficient probability that central control 200 will generate an "accelerate train" message—message 515—while rail system is in state 506. When there is such probability, state 506 is classified as undesirable. In other words, state 506 is classified as undesirable by virtue of being a precursor to another state which can be classified as undesirable according to the methods of task 730.

In accordance with the illustrative embodiment of the present invention, the sufficient probability is 80% or more chance that rail system 300 will enter state 502 after it enters state 506. However, it will be clear to those skilled in the art, after reading this disclosure, how to make and use alternative embodiments of the present invention in which the sufficient probability is different (e.g., 50%, 60%, etc.)

In accordance with the first alternative embodiment of the present invention, message dispatcher 220 uses models of the operation of rail system 300, such as the one discussed with respect to FIG. 5, in determining the probability of rail system 300 transitioning into an undesired state. It will be clear to those skilled in the art how to devise such models, as well as program message dispatcher 220 to use them.

At task 750, message dispatcher 220 determines the relative importance of the message received at task 610 as assessed under the current state of rail system 300. In accordance with the illustrative embodiment of the present invention, message dispatcher 220 classifies messages as either high-priority or low-priority. However, it will be clear to those skilled in the art, after reading this disclosure, how to make and use alternative embodiments of the present invention in which messages are classified into any number of groups (e.g., 3, 5, 10, 100). Task 750 is further described in the discussion with respect to FIG. 8.

Figure 8:
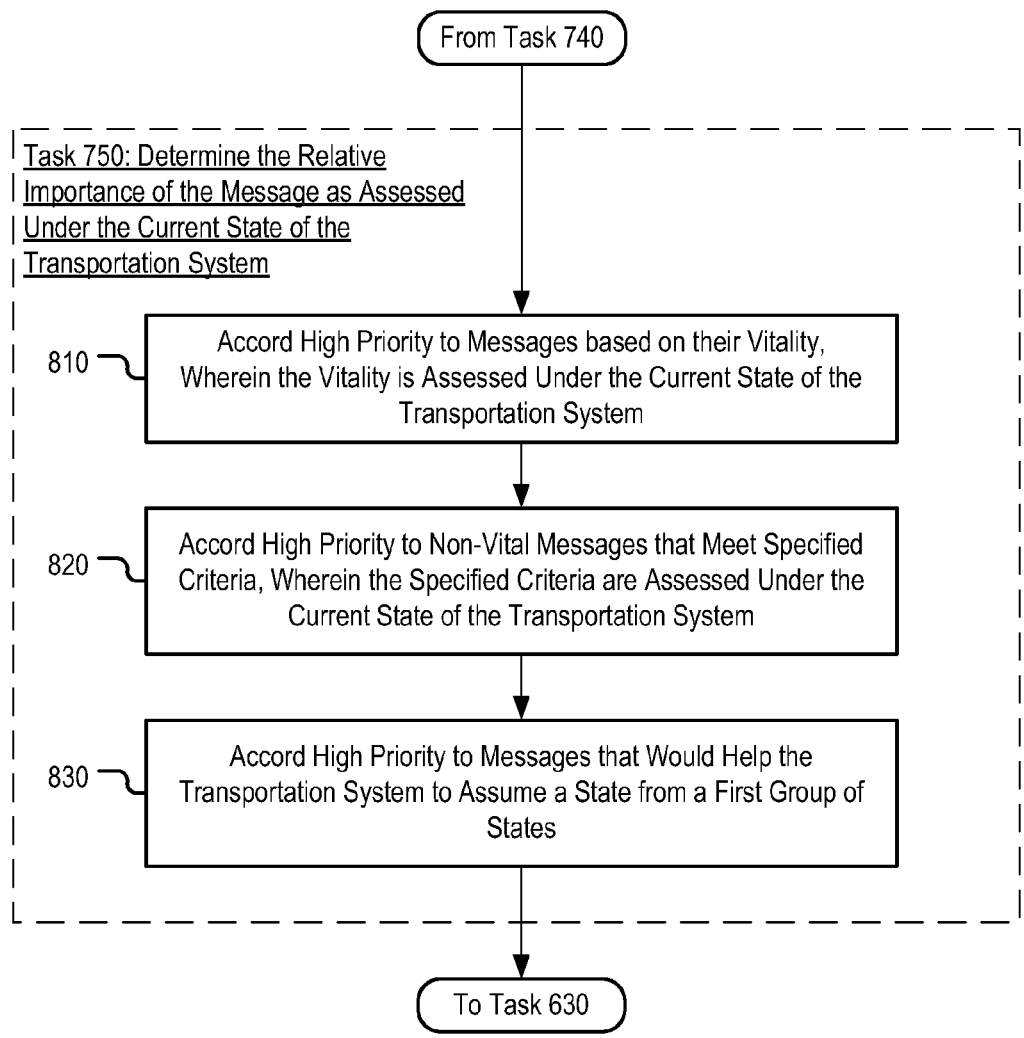
FIG. 8 depicts a flowchart of the execution of the salient subtasks associated with the execution of task 750.

FIG. 8 depicts a flowchart of the execution of the salient subtasks associated with the execution of task 750. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks.

At task 810, message dispatcher 220 accords high priority to messages that are vital (or safety critical). Message dispatcher considers at least two types of messages vital:
(1) messages whose successful (and/or timely) delivery would likely cause rail system 300 to transition out of a hazardous state;
(2) messages whose failed (and/or delayed) delivery would likely cause rail system 300 to transition into a hazardous state.

Specifically, at task 810, message dispatcher 220 determines the effects of failed/delayed delivery of the message payload (e.g. instructions, status updates, etc.). In doing so, message dispatcher 220 uses a model of the operation of rail system 300, such as, but not limited to, the one discussed in relation to FIG. 5. It will be clear to those skilled in the art how to devise such models, as well as program message dispatcher 220 to use them in order to determine the effects of failed and/or delayed delivery of messages.

As noted, messages can contain an order to execute an action or an information update. An example of a message which contains an order to execute an action is message 525 which contains an instruction for gate 330 to enter the "lowered" state. As the state chart depicted by FIG. 5 shows, this message would cause rail system 300 to exit the hazardous state 502 and transition to state 501. For this reason, when rail system 300 is in state 502, "lower gate" messages are considered vital.

An example of a message carrying an information update is one which contains an update on the speed and location of nearby trains, as well as the state of other nearby trackside features. In general, the closer the trains are to the transportation system trackside feature, the less time there is for the trackside features to react to prevent a disaster if something unexpected happens. For instance, if switch 320 fails and is unable to enter the "north" state, it is important for gate 330 to know, so it can autonomously enter the "lowered" state (i.e., without there being an instruction from central control 200) and prevent an accident from happening. For this reason, when rail system 300 is in a state in which train 310 is close to switch 320 (e.g., 500 meters away, etc.), messages directed to gate 330 which indicate the state of switch 320 are also considered vital.

At task 820, message dispatcher 220 accords priority to messages that are not considered vital (or safety-critical). In accordance with the illustrative embodiment of the present invention, message dispatcher 220 classifies non-vital messages as high-priority if they are:
(1) messages whose successful (and/or timely) delivery would likely cause rail system 300 to transition out of an undesirable state, or
(2) messages whose failed (and/or delayed) delivery would likely cause rail system to transition into an undesirable state.

An example of a non-vital message which is entitled to priority is message 545 which would cause rail system 300 to exit state 503.

In executing task 820, message dispatcher 220 determines the effects of failed/delayed delivery of the message payload (e.g. instructions, status updates, etc.). In doing so, message dispatcher 220 uses a model of the operation of rail system 300, such as, but not limited to, the one discussed in relation to FIG. 5. It will be clear to those skilled in the art how to devise such models, as well as program message dispatcher 220 to use them in order to determine the effects of failed and/or delayed delivery of messages.

At task 830, message dispatcher 220 classifies as high priority messages which would cause rail system 300 to enter a desirable state. An example of a desirable state is a one in which train 310 travels at a speed that is the most fuel efficient. Correspondingly, an example of a message which would cause rail system 300 to reach this state is a message from central control 200 which carries an "accelerate" or "decelerate" order and would cause train 310 to reach the optimal speed. Because this message would cause rail system to enter a desirable state, it is accorded a high priority.

In accordance with the illustrative embodiments of the present invention, message dispatcher 220 uses a model of the operation of rail system 300, such as, but not limited to, the one discussed in relation to FIG. 5. It will be clear to those skilled in the art how to devise such models as well as program message dispatcher 220 to use them. Additionally, message dispatcher 220 identifies which states are desirable by using a table stored in memory 250 which relates identifications of states of rail system 300 to designations of the states as "desirable."

Figure 9:
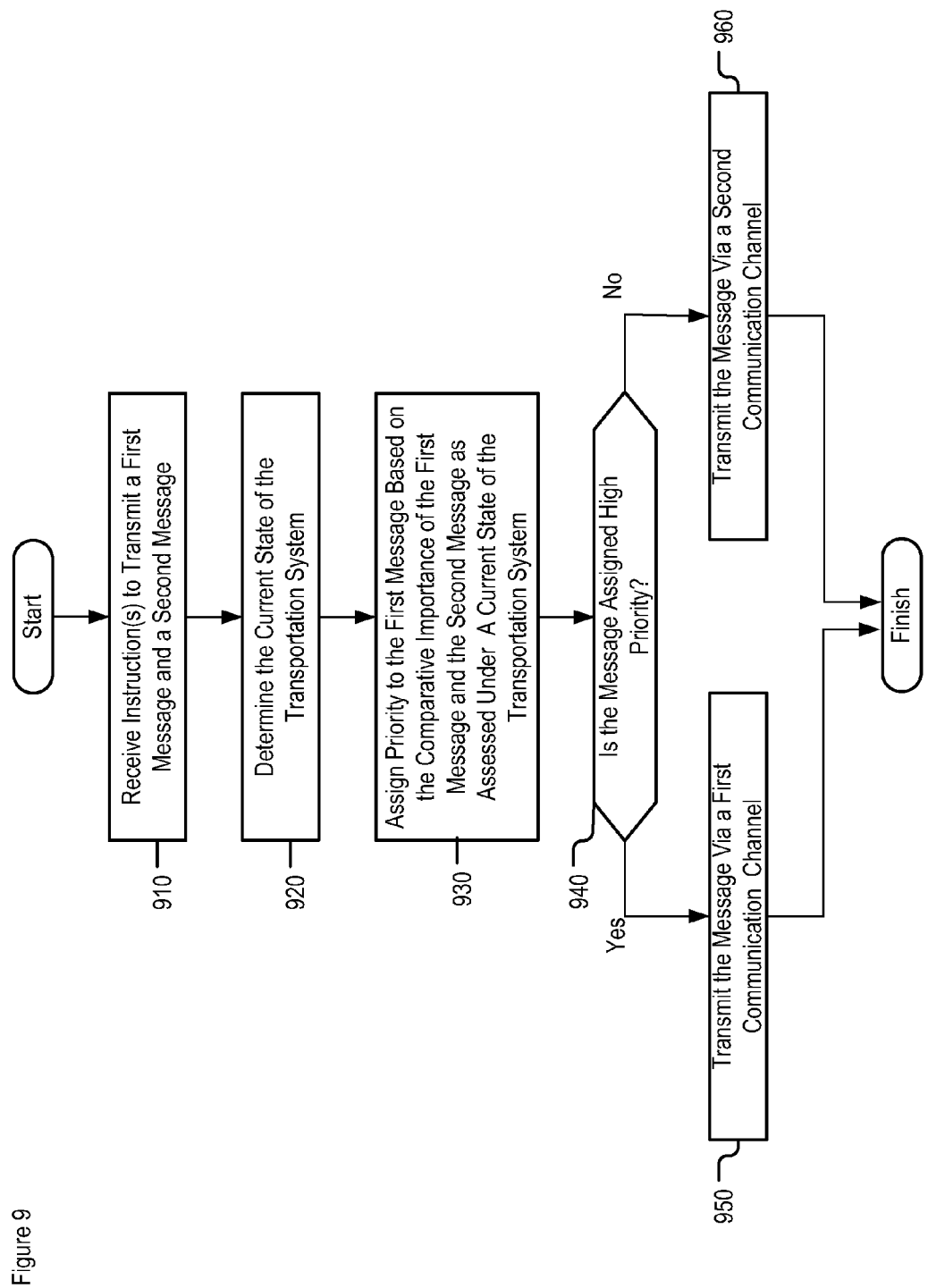
FIG. 9 depicts a flowchart of the execution of the salient tasks associated with the operation of another illustrative embodiment of the present invention.

FIG. 9 depicts a flowchart of the execution of the salient tasks associated with the operation of another illustrative embodiment of the present invention. It will be clear to those skilled in the art, after reading this disclosure, how to perform the tasks associated with FIG. 9 in a different order than represented or to perform one or more of the tasks concurrently. Furthermore, it will be clear to those skilled in the art, after reading this disclosure, how to make and use alternative embodiments of the present invention that omit one or more of the tasks.

At task 910, message dispatcher 220 receives instruction(s) to transmit a first and second message. In accordance with the illustrative embodiment of the present invention, the first message is a "lower gate" message and the second message is an "accelerate train" message.

At task 920, message dispatcher determines the current state of rail system 300 by querying operation guideway database 230. In accordance with the illustrative embodiment of the present invention, rail system 303 is in state 506.

At task 930, message dispatcher 220 assigns a priority to the first message based on the comparative importance of the first message and the second message as assessed under the current state of the transportation system. In accordance with the illustrative embodiment of the present invention, the message is assigned either a high or low priority status. However, it will be clear to those skilled in the art, after reading this disclosure, how to make and use alternative embodiments of the present invention in which any number of priority statuses is possible (e.g., 3, 5, 10, etc.).

In accordance with the illustrative embodiment of the present invention, the first message is assigned high priority if:
  (1) the unsuccessful (and/or delayed) receipt of the first message combined with the successful (and/or timely) receipt of the second message would likely cause the transportation system to remain in an undesirable state, or
  (2) the unsuccessful (and/or delayed) receipt of the first message combined with the successful (and/or timely) receipt of the second message would likely cause the transportation system to transition into an undesirable state.

As FIG. 5 shows, if the "lower gate" message is lost or received after the "accelerate train" message, rail system 300 will enter the undesirable (and hazardous in this case) state 502. Therefore, in accordance with the illustrative embodiment of the present invention, message dispatcher 220 accords high priority to the "lower gate" message.

At task 940, message dispatcher 220 determines whether the first message was assigned high priority. If yes, message dispatcher 220 proceeds to execute task 950. Otherwise, message dispatcher executes task 960.

At task 950, message dispatcher 220, in a well known fashion, transmits the message over a first telecommunications channel.

At task 960, message dispatcher 220, in a well known fashion, transmits the message over a second telecommunications channel.

The first and second telecommunications channels are identical to the telecommunications channels described in the discussion with respect to tasks 640 and 650.

Figure 10:
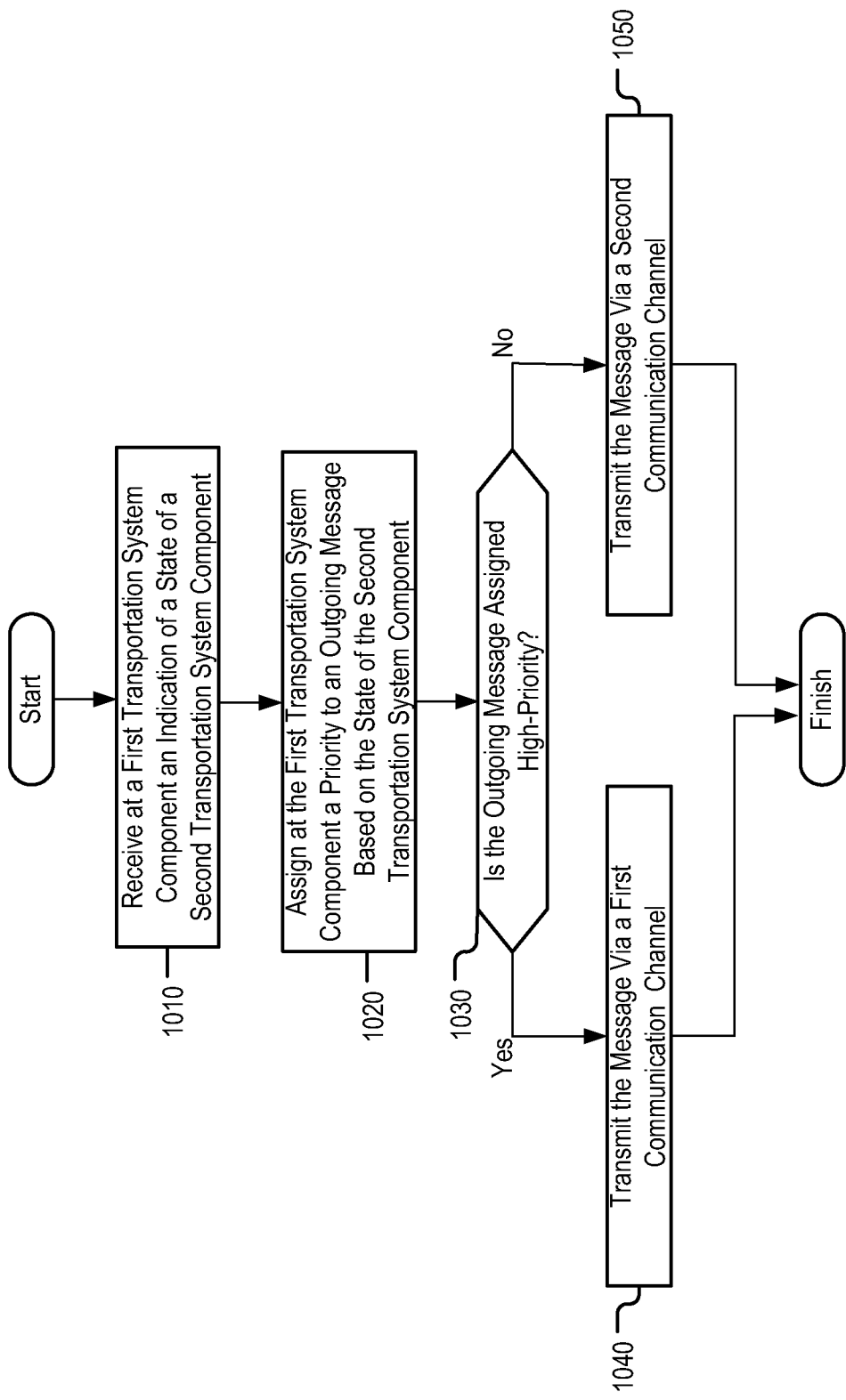
FIG. 10 depicts a flowchart of the execution of the salient tasks associated with the operation of yet another illustrative embodiment of the present invention.

FIG. 10 depicts a flowchart of the execution of the salient tasks associated with the operation of yet another illustrative embodiment of the present invention. It will be clear to those skilled in the art, after reading this disclosure, how to perform the tasks associated with FIG. 10 in a different order than represented or to perform one or more of the tasks concurrently. Furthermore, it will be clear to those skilled in the art, after reading this disclosure, how to make and use alternative embodiments of the present invention that omit one or more of the tasks.

At task 1010, gate 330 receives an indication of the state of switch 320.

At task 1020, gate 330 assigns a priority status to an outgoing message based on the state of another trackside feature. In accordance with the illustrative embodiment of the present invention, the outgoing message is assigned priority based on the state of switch 320.

More specifically, the priority is assigned on the basis of a rule which is stored in the memory of gate control 430. The rule defines the priority of outgoing messages from gate 330 based on the state of other transportation system components (e.g., trackside features, trains, etc.) In accordance with the illustrative embodiment of the present invention, the rule provides that when switch 320 is in the "east" state, all outgoing messages from gate 330 are assigned high priority.

In accordance with one alternative embodiment of the present invention, the rule is provided by central control 200 periodically (e.g., every time rail system 300 transitions in a predetermined state, etc.). In specifying the rule, central control 200 identifies the types of messages which gate control 430 is capable of transmitting. Then, central control 200, performs the analysis described in the discussion with respect to FIG. 8 in order to determine the effects of failed and/or delayed delivery of the messages, should they be transmitted by the trackside feature, on rail system 300. Based on this analysis, central control 200 specifies rules for the assignment of priority to one or more types of messages that can be potentially transmitted from the trackside feature.

At task 1030, gate 330 determines whether the first message was assigned high priority. If yes, gate 330 proceeds to execute task 1040. Otherwise, gate 330 executes task 1050.

At task 1040, gate 330, in a well known fashion, transmits the message over the first channel.

At task 1050, gate 330, in a well known fashion, transmits the message over the second channel.

The first and second telecommunications channels are identical to the telecommunications channels described in the discussion with respect to tasks 640 and 650.

Although, the present invention is described in relation to rail systems, it is to be understood that the principles and methods presented by the invention can be applied to any type of transportation system (e.g., water-based, land-based, etc.) Furthermore, it is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method associated with a transportation system, the method comprising:
  classifying a first state of the transportation system based on whether an operational constraint of the transportation system is violated while the transportation system operates in the first state, resulting in a classification of the first state;
  assigning a priority to a first message, wherein the priority is based on an importance of the first message relative to the classification of the first state, and wherein the priority depends on one of:

i. the likelihood that the transportation system will transition into a second state when (1) a delivery of the first message is unsuccessful or delayed and (2) a delivery of a second message is successful and timely, and ii. the likelihood that the transportation system will remain in the first state when (1) the delivery of the first message is unsuccessful or delayed and (2) the delivery of the second message is successful and timely; and transmitting the first message in accordance with the assigned priority, wherein messages having a relatively higher priority are transmitted via a first channel and messages having a relatively lower priority are transmitted via a second channel.

2. The method of claim 1 wherein the first channel and the second channel are logical channels of a single physical channel.

3. The method of claim 1 wherein the priority is further based on whether or not the first message contains safety-critical information.

4. The method of claim 1 wherein the priority is further based on whether or not there has been a change in state of a feature of the transportation system since a prior transmission of the state of the feature.

5. The method of claim 1 wherein the priority is further based on whether the first message revokes or grants an authorization.

6. A method comprising:

classifying a first state of a transportation system based on whether a first operational constraint of the transportation system is violated while the transportation system operates in the first state;

classifying a second state of the transportation system based on whether a second operational constraint of the transportation system is violated while the transportation system operates in the second state;

assigning a priority to a first message based on the content of a second message, wherein the priority depends on one of:

i. the likelihood that a transportation system will transition into the first state when (1) a delivery of the first message is unsuccessful or delayed and (2) a delivery of the second message is successful and timely, and ii. the likelihood that the transportation system will remain in the second state when (1) the delivery of the first message is unsuccessful or delayed and (2) the delivery of the second message is successful and timely; and transmitting the first message in accordance with the assigned priority, wherein:

i. the first message is transmitted via a first channel when it is assigned a relatively high priority, and ii. the first message is transmitted via a second channel when it is assigned a relatively low priority.

7. The method of claim 6 wherein the first channel and the second channel are logical channels of a single physical channel.

8. The method of claim 6 wherein the priority of the first message is further based on whether or not the first message contains safety-critical information, wherein the criticality of the information with respect to safety is relative to the second state of the transportation system.

9. The method of claim 6 wherein the priority of the first message is further based on whether or not there has been a change in state of a feature of the transportation system since a prior transmission of the state of the feature.

10. The method of claim 6 wherein the priority of the first message is further based on whether the message revokes or grants an authorization.

11. The method of claim 1 wherein the classification of the first state is classified as one of desirable and undesirable, and further wherein the assigned priority is one of high-priority and low-priority.

12. The method of claim 1 wherein a high priority is assigned to a vital message, and further wherein a vital message is at least one of:

(i) a message whose successful delivery would cause the transportation system to transition out of a first state that is classified as hazardous, and (ii) a message whose timely delivery would cause the transportation system to transition out of a first state that is classified as hazardous, and (iii) a message whose failed delivery would cause the transportation system to transition from the first state to another state that is classified as hazardous, and (iv) a message whose untimely delivery would cause the transportation system to transition from the first state to another state that is classified as hazardous.

13. The method of claim 1 wherein a high priority is assigned to a non-vital message when at least one of:

(i) a successful delivery of the message would cause the transportation system to transition out of a first state that is classified as undesirable, and (ii) a timely delivery of the message would cause the transportation system to transition out of a first state that is classified as undesirable, and (iii) a failed delivery of the message would cause the transportation system to transition from the first state into another state that is classified as undesirable, and (iv) a delayed delivery of the message would cause the transportation system to transition from the first state into another state that is classified as undesirable.

14. A transportation system comprising:

a plurality of system-components; and a central control that comprises:

(A) a first channel that is configured to carry higher priority messages, and (B) a second channel that is configured to carry lower priority messages, and (C) a control unit that is configured to send and receive messages to and from each of the plurality of system-components, and (D) a message dispatcher that is configured to:

(i) receive each message from the control unit along with an instruction to dispatch the message to a specified system-component, and (ii) classify the current state of the transportation system based on whether a first operational constraint of the transportation system is violated while the transportation system operates in a first state, and (iii) assign a priority to a first message that depends on one of: (a) the likelihood that the transportation system will transition into a second state when (1) a delivery of the first message is unsuccessful or delayed and (2) a delivery of a second message is successful and timely, and (b) the likelihood that the transportation system will remain in the first state when (1) the delivery of the first message is unsuccessful or delayed and (2) the delivery of the second message is successful and timely, and (iv) transmit the first message to the specified system-component via one of the first channel and the second channel according to the assigned priority.

15. The transportation system of claim 14 wherein the first channel and the second channel are logical channels of a single physical channel.

16. The transportation system of claim 14 wherein the assigned priority is further based on whether or not the received message contains safety-critical information.

17. The transportation system of claim 14 wherein the assigned priority is further based on whether or not there has been a change in state of a feature of the transportation system since a prior transmission of the state of the feature.

18. The transportation system of claim 14 wherein the assigned priority is further based on whether the received message revokes or grants an authorization.

* * * * *